United States Patent [19]

Elphingstone et al.

[11] 4,293,440

[45] Oct. 6, 1981

[54] TEMPERATURE GELATION ACTIVATED AQUEOUS SILICATE MIXTURES AND PROCESS OF FORMING IMPERMEABLE GELS

[75] Inventors: Eugene A. Elphingstone; Homer C. McLaughlin; Charles W. Smith, all of Duncan, Okla.

[73] Assignee: Halliburton Company, Duncan, Okla.

[21] Appl. No.: 30,205

[22] Filed: Apr. 16, 1979

Related U.S. Application Data

[63] Continuation-in-part of Ser. No. 613,726, Sep. 15, 1975, abandoned.

[51] Int. Cl.³ ............................................. B01J 13/00
[52] U.S. Cl. .................................... 252/317; 166/288; 166/293; 405/266; 405/267; 405/270
[58] Field of Search ................ 252/317; 166/292, 293, 166/288; 405/266, 267, 270

[56] References Cited

U.S. PATENT DOCUMENTS

| 2,281,810 | 5/1942 | Stone et al. ...................... 252/317 X |
| 3,059,997 | 10/1962 | Schwartz ......................... 252/317 X |
| 3,202,214 | 8/1965 | McLaughlin, Jr. ............. 252/317 X |
| 3,375,872 | 4/1968 | McLaughlin et al. ............. 166/292 |

FOREIGN PATENT DOCUMENTS 825174 12/1959 United Kingdom ................ 405/270

*Primary Examiner*—Richard D. Lovering
*Attorney, Agent, or Firm*—John H. Tregoning; Robert S. Nisbett; Thomas R. Weaver

[57] ABSTRACT

Energy level or temperature activated aqueous silicate compositions which gel into impermeable masses at preselected temperatures and processes of selectively forming such gels are provided using as temperature responsive gel activators certain halogenated hydrocarbons with solubilizing groups of hydrogen, carbinol, sulfonyl, aldehyde, ester and carboxyl radicals, the acid equivalents of such radicals or combinations of such radicals and acid equivalents.

23 Claims, No Drawings

TEMPERATURE GELATION ACTIVATED AQUEOUS SILICATE MIXTURES AND PROCESS OF FORMING IMPERMEABLE GELS

This application is a continuation-in-part of application Ser. No. 613,726 filed Sept. 15, 1975 (now abandoned).

Aqueous silicate solutions which are gelled or solidified with acid producing activators have been known and used in many applications including grouting processes and in sealing and consolidation processes carried out in subterranean well formations. A number of water soluble silicates and processes using such silicates are described in U.S. Pat. Nos. 3,202,214; 3,375,872 and 3,376,926, and a typical water soluble silicate is described in SODIUM SILICATE HANDBOOK published in 1970 by the Diamond Shamrock Corporation, which patents and handbook are expressly incorporated herein by reference.

Sodium silicate is a complicated system of various molecular weight silica polymers in an alkaline solution. Aside from requiring a certain minimum amount of alkalinity, sodium silicate has no definite chemical combining numbers. When sodium silicate is acidified to a pH less than about 10 or 11, the sodium silicate is converted partially to silicic acid. Silicic acid exists at these alkaline pH's as it is such a weak acid. Instead of precipitating and making silica, $SiO_2$, the silicic acid remains hydrated and forms a three-dimensional network in trapping the solvent water. This network is a gel since both phases are continuous. A slight lowering of the pH brings about radical changes in gel time. Consequently, gel times are difficult to control, and lumping from local acid concentrations during large scale mixing frequently occurs.

Acid producing gelation activators used heretofore with aqueous silicate solutions bring about the gelation of the solutions immediately or within a relatively short time after the activator is added to the solutions so that the use or placement of the resulting mixtures must be completed within a relatively short period of time. Consequently, unexpected delays or other unexpected conditions have frequently brought about failures in the intended use of the mixtures because of premature gelation, flash settling and mixing problems.

By the present invention, thermally responsive silicate solution gelation activators are utilized which can be mixed with an aqueous silicate solution as part or all of the required acid producing activator; yet, the mixture containing the activator will not gel until the temperature of the mixture is raised to a given level. The use of such temperature responsive aqueous silicate mixtures makes it possible to apply or place the mixtures in particular applications with little or no risk of premature gelation. Further, aqueous silicate compositions of this invention can be prepared in advance and stored for relatively long periods of time before use.

Silicates which can be used for the compositions and processes of this invention are the water soluble silicates which form silicate polymer chains or gel upon acidification. The preferred silicates are those of the alkali metals, especially sodium potassium and combinations thereof. These silicates are commercially available as dry powders or concentrated aqueous solutions having in the range of from about 38 to 55 parts solids per hundred parts of solution and a pH in the range of from 10 to 13 (hereinafter referred to as "concentrated aqueous silicate"). The concentrated aqueous silicate and the aqueous silicate mixtures of this invention including the temperature responsive activators described hereinbelow preferably have a pH of greater than about 9, most preferably in the range of from about 10 to 13 at temperature levels below the activation temperature. Upon activation and the production of acid or acid equivalents by the activator, the pH of the aqueous silicate mixture is decreased to a pH below about 9 and the mixture gels or sets. For mixtures containing both conventional activators, e.g., esters, and the thermal activators of this invention, the pH of the mixtures cannot be below the 9 to 13 range or otherwise gelation will begin. The delay and the long shelf life referred to herein is the time period following mixing of a temperature responsive activator of this invention with an aqueous silicate solution and ending with the beginning of gelation and does not refer to the actual gelation period.

The temperature responsive gelation activators of this invention are compounds of the formula:

$$X_nR\text{-}W$$

wherein n is an integer in the range of from 1 to 6; X is a halide substituent on an alpha carbon, a terminal carbon or both; R is an alkyl radical, an aryl radical or an alkylaryl radical with the alkyl radicals having 1 to 6 carbon atoms and the aryl radicals having 6 to 10 carbon atoms; and W is a group of carboxyl, ester, aldehyde, carbinol, hydrogen, sulfonyl (e.g., sulfonate) or combinations and equivalents thereof.

The activators can be considered bifunctional compounds in that the number, location and type of halide substituents determine the temperature or energy level at which the activators disassociate and lower the pH of an aqueous silicate mixture causing the mixture to gel or polymerize and the "W" group is a solubilizing group. The "R" or hydrocarbon group ties the halide substituents and solubilizing group together and to a limited extent influences the temperature at which disassociation takes place. Some disassociation of the temperature responsive activator may begin when the activator is mixed with the aqueous silicate solution; however, at temperatures below the temperature at which complete disassociation takes place, the gelation rate is very low. By selecting the solubilizing group, the size and configuration of the hydrocarbon group, the degree and location of halogenation and the particular halogen substituents, a temperature responsive activator can be selected to give the desired solubility, acidity and activation temperature.

For most applications, the high solubility of activators with short hydrocarbon groups and hydrophilic solubilizing groups are most suitable. High solubility reduces the tendency of the activator to separate from the aqueous silicate thereby producing more uniform gelation and reducing the risk of premature gelation or localized gelation. Consequently "R" in the above formula is preferably a short chain alkyl or alkene hydrocarbon radical or an aryl hydrocarbon radical, e.g., phenyl. The alkyl and alkene radical can have straight or branched chains and preferably, the alkyl and alkene radicals have from 1 to 6 carbon atoms, and for higher solubility 1 to 3 carbon atoms. Aryl radicals preferably have from 6 to 10 carbon atoms, and most preferably 6 carbon atoms. When "R" groups with long chains are used, the halogen substituents should be on both the alpha carbon adjacent the solubilizing group and on the terminal carbon opposite the solubilizing group. It is believed that the activation temperature is determined by balance of the electron affinity of the solubilizing group and the halogen substituents along the hydrocarbon chain, or in other words, that the unsaturated linkages, the halogen substituents and the solubilizing group have what can be termed a balanced electron affinity which makes the activator stable up to a given temperature or energy level, at which the activator completely disassociates.

Upon the disassociation of the activators of this invention, acid groups or acid equivalent groups are produced which react with the aqueous silicate solution to lower the pH thereof and cause the gelation or polymerization thereof. That is, when the pH of the aqueous silicate solution is lowered by the activator to a value within the range of from about 7 to about 12.2, the gelation phenomenon takes place. This, in effect, reduces the pH of the concentrated aqueous silicate below the range of about 10 to 13 which is required for a stable aqueous silicate mixture.

It is known that groups such as hydrogen ions, acid halides, halide radicals and carbon dioxide rapidly cause gelation of aqueous silicate solutions. Preferred temperature responsive activators of this invention which produce a high concentration of these gelation groups are the water soluble salts of halogenated alkyl carboxylic acids and equivalents thereof. A particularly preferred group of temperature responsive activators for use in accordance with this invention are the water soluble halogenated alkyl carboxylic acids and salts thereof having the general formula:

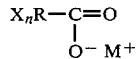

wherein R is a hydrocarbon radical having in the range of from 1 to about 10 carbon atoms; X is a halogen substituent selected from the group consisting of iodine, bromine, fluorine, chlorine and combinations thereof; n is an integer in the range of from 1 to 3; and M is a cation selected from the group consisting of hydrogen, alkali metal, alkaline earth metal and ammonium ions.

The salts of alkali metals, alkaline earth metals and ammonia are preferred for solubility in an aqueous system. The preferred alkali metals are sodium, potassium and combinations thereof. The preferred alkaline earth metals are calcium, magnesium and combinations thereof. Such salts, e.g., sodium trichloroacetate (NaTCA), are believed to begin disassociation by splitting off a carboxyl group and ultimately producing the equivalent of 2 moles of hydrochloric acid and 2 moles of carbon dioxide per mole of acid or acetate. Only about 1.5 to 2 grams of such salts per 100 milliliters of aqueous silicate solution containing about one volume of concentrated aqueous silicate per 6 volumes of aqueous silicate mixture are required for a practical gelation time of about 24 hours. The mixture is activated at a temperature of from about 100° to about 140° C. or temperatures above about 65° C. At temperatures below about 60° C., most of such activators produce aqueous silicate-activator mixtures with good shelf life and little risk of premature gelation.

The equivalents of carboxylic acids which can be used include esters, especially those in which the ester linkage tends to hydrolyze or disassociate at a temperature near the disassociation temperature of the halogenated hydrocarbon group. Likewise, in view of this disclosure, similar suitable groups which correspond to the carboxyl group can be considered in a progressive or corresponding order. These groups must be considered with the halogenated hydrocarbon portion of the activator since it is believed that the temperature responsive disassociation is caused by balanced molecular stability. The group should also be considered for its ability to produce the desired acidic groups upon disassociation without high acidity below the activation temperature.

Examples of groups and compounds which can be utilized are listed as follows: sulfonyl, trifluoromethylsulfonic acid or the alkali metal salt (e.g., sodium or potassium) thereof; aldehyde, chloral; carbonil, 2,2,2-trichloroethanol; esters, methyltrichloroacetate and 2,2,2-trichloroethyl acetate; and hydrogen, chloroform. Suitable carbinols include 2,2,2-trichloro-1-ethanol; 1,1,1-trichloro-2-propanol; 1,1,1,2-tetrachloro-2-propanol; 1,1,1-trichloro-2-butanol and 1,1,1-trichloro-2-methyl-2-propanol. Suitable aldehydes include trichloroacetaldehyde; alpha,alpha,beta-trichloropropionaldehyde; alpha,alpha,beta-trichloro-n-butyraldehyde; alpha,alpha,gamma-trichloro-n-butyraldehyde; chloral hydrate and chloral diethylacetal. Suitable esters include methyl trichloroacetate, trichloromethyl trichloroacetate, beta-hydroxyethyl trichloroacetate, ethyl trichloroacetate, beta-methoxyethyl trichloroacetate, n-propyl trichloroacetate, isopropyl trichloroacetate, n-butyl trichloroacetate, isobutyl trichloroacetate, tert-butyl-trichloroacetate, secbutyltrichloroacetate, n-amyl-trichloroacetate, iso-amyltrichloroacetate, and tert-amyl-trichloroacetate. Suitable compounds with hydrogen in the place of carboxyl include chloroform, iodoform, bromoform, fluoroform, chlorodifluoromethane, and dichlorofluoromethane.

Another class of compounds which can be utilized in accordance with this invention includes halogenated hydrocarbons especially the chlorinated and fluorinated alkyls. Although the water solubility of these compounds may require that they be dispersed in the aqueous silicate mixture, the chlorinated and fluorinated hydrocarbons having 1 to 6 carbon atoms in the alkyl radicals are preferred for high temperatures. Such fluorocarbons are described in ADVANCES IN FLUORINE CHEMISTRY, by Barbour et al. and by Hamilton, published in 1963 by Butterworth, Inc., Washington, D.C. Preferred fluorocarbons include dichlorodifluoromethane and trichlorofluoromethane. Preferred chlorohydrocarbons include carbon tetrachloride.

In the preferred class of activators, i.e., the halogenated alkyl carboxylic acid salts, the activation temperature increases as the degree of halogenation increases. Chlorine or fluorine and combinations thereof are preferred for the halogen substituents for good predictability of activation temperature. For example, when a sodium salt of a trihalogenated acetate is used as an activator in accordance with this invention, the trichloro salt has an activation temperature of about 200° F.; the dichloromonofluoro salt has an activation temperature of about 275° F.; the monochlorodifluoro salt has an activation temperature of about 325° F.; and the trifluoro salt has an activation temperature of about 400° F.

The activator concentration in an aqueous silicate solution also affects the gelation time. For a preferred aqueous silicate mixture containing about one volume of concentrated aqueous silicate in 6 volumes of aqueous mixture, an acid or acid equivalent concentration of about 20 milliequivalents (MEQ) per 16 milliliters of concentrated aqueous silicate mixed with water for about 100 ml of total aqueous mixture brings about a gelation time of about 24 hours. For preferred activators, i.e., water soluble salts of halogenated alkyl carboxylic acids, this concentration is from about 0.5 to 5 grams per 100 milliliters of silicate mixture, or 0.1 to 10 grams, preferably 0.2 to 5 grams, of activator per 100 grams of water soluble silicate solids in the mixture. For a practical gelation rate, the acid or acid equivalent concentration above the activation temperature should be in the range of from about 20 to about 40 milliequivalents per 16 milliliters of concentrated aqueous silicate per about 100 ml of aqueous mixture. Below the thermal activation temperature, the concentration of acid or acid equivalents should be below about 20 milliequivalents per 16 milliliters of concentrated aqueous silicate so that the aqueous silicate composition does not gel and has a pH in the range of about 10 to 13. The total milliequivalents of acid radical, proton or hydrogen ion in the aqueous silicate mixture above the activation temperature determines the silicate setting rate, the firmness of the resulting gel and other properties of the resulting gel. Acid concentration expressed in milliequivalents as used herein is defined in the ENCYCLOPEDIA OF CHEMICAL TECHNOLOGY, by Kirk-Othmer, published in 1963 by John Wiley and Sons, New York, which is expressly incorporated herein by reference.

The temperature of the thermally activated aqeuous silicate compositions of the present invention can be raised to a level causing the gelation of the compositions using a variety of methods. In a preferred grouting process the aqueous silicate solution is mixed with activator, applied to a substrate which is to be grouted and the mixture is heated to cause the activator to react and gel the silicate solution. The heating of the silicate mixture can be accomplished using radiant light heat or heat created by other techniques such as an electromagnetic field.

In carrying out subterranean well formation treatments in accordance with this invention, an aqueous silicate solution is mixed with one or more activators which bring about the gelation of the solution at the temperature level to which the mixture is heated in the formation, i.e., a temperature level which is higher than the temperature level at which the mixture is prepared and introduced into the formation. Upon being introduced into the formation, the formation heat causes the temperature of the silicate mixture to rise to the level necessary for the activator to react and gel the silicate. If the formation temperature is well above the activator reaction temperature, it may be desirable to cool the formation prior to application or injection of the silicate mixture to delay gelation or insure against premature gelation.

Conventional acid producing activators can be used with the temperature responsive activators of this invention so long as the acid or acid equivalent concentration in the aqueous silicate mixture is below about 20 milliequivalents per about 16 milliliters of concentrated aqueous silicate solution prior to the activation of the temperature responsive activator, i.e., prior to the disassociation of the temperature responsive activator and the production of additional acid or acid equivalents. As stated above, the total concentration of acid equivalents in the silicate mixture after the disassociation of the temperature responsive activator should be in the range of from about 20 to about 40 acid milliequivalents per 16 milliliters of concentrated aqueous silicate to cause gelation of the mixture.

With highly concentrated silicate mixtures, contamination by salts, acids, etc., must be carefully avoided and the mixtures should be carefully and uniformly mixed with activator and any optional particulate filler used such as silica flour. For most applications, the activator is preferably added to and mixed with the silicate solution as a solution or an aqueous dispersion. The concentrated aqueous silicate is also typically diluted to reduce the viscosity for easier application and pumping.

In certain applications it may be necessary to follow special mixing procedures to avoid the likelihood of local dehydration of the silicate when the activator is combined therewith. When the activator to be used is readily soluble in water, it is preferably diluted by using one of the two volumes of water ordinarily used to dilute the commercially available concentrated aqueous silicate.

As will be understood by those skilled in the art, the particular advantage of the present invention resides in the ability to provide a predictable delay in the gelling reaction of a sodium silicate solution and gelation activator. The particular activator can be selected to provide the delay which is necessary or desirable for best results in accordance with the conditions which prevail in a particular application.

In order to further illustrate the invention the following examples are given.

EXAMPLE 1

Samples of aqueous alkali metal silicate mixture are prepared by mixing one volume of concentrated aqueous sodium silicate with 2 volumes of water. The concentrated aqueous sodium silicate is described as Grade 40 in the SODIUM SILICATE HANDBOOK and contains about 38 parts solids per 100 parts concentrate with a ratio of 3.22 moles of $SiO_2$ per mole of $Na_2O$ and a pH of about 13.

A temperature responsive activator solution is prepared by mixing sodium trichloroacetate with water at a concentration of 2 grams of salt per 50 milliliters of solution.

50 milliliters of sodium silicate mixture are mixed with 50 milliliters of activator to produce a 100 milliliter sample. To this sample, 171 grams of silica flour filler are added to increase the response of solution viscosity to gel formation.

Several 100 milliliter samples with silica flour filler and activator are placed in a constantly stirred heated bath maintained at about 94° C. The time for initial gel formation and final gel quality are observed and noted. The initial gel time is the time at which the viscosity of the mixture increases to the point where it reduces the mixture's tendency to flow from the sample container. This can also be observed as a change of the mixture from clear to cloudy or translucent. The final gel time is the time when the mixture completely ceases to flow or there is a rapid and large increase in viscosity.

Samples are also prepared and tested using different concentrations of activator and different bath temperatures. The variation of gel time with activator concentration is shown in Tables I and II. Table I also shows the effect of mixture temperature on gel time and quality. Tables III and IV show the effect of using 2 and 1.5 grams, respectively, of sodium trichloroacetate activator per 100 milliliters of silicate mixture and various bath temperatures on gel time and quality. Table V also shows the effect of various sodium trichloroacetate activator concentrations and bath temperatures where samples were heated in the bath under autogenous pressure.

From the data in Tables I through V it can be seen that a practical gel time is affected by activator concentration and the activation temperature. Tables II through IV further show that at temperatures below about 60° C., the silicate-activator mixtures have a good shelf life or an adequate storage and handling period without risk of premature gelation.

TABLE I

Gelation of Aqueous Sodium Silicate at 200° F.

| Sample No. | Activator Gm NaTCA per 100 ml Solution | MEQ—H+ | Gel Time Min. | Gel Quality |
|---|---|---|---|---|
| 1 | 2 | 38.9 | 38:00 | Firm Gel |
| 2 | 2 | 38.9 | 33:00 | Firm Gel |
| 3 | 1.5 | 29.1 | 44:00 | Firm Gel |
| 4 | 1.5 | 29.1 | 44:00 | Firm Gel |
| 5 | 1.25 | 24.3 | 51:00 | Good Gel |
| 6 | 1.25 | 24.3 | 55:00 | Good Gel |
| 7 | 1.2 | 23.3 | 50:00 | Good Gel |
| 8 | 1.2 | 23.3 | 53:00 | Good Gel |
| 9 | 1.15 | 22.3 | 61:00 | Fair Gel |
| 10 | 1.15 | 22.3 | 67:00 | Fair Gel |
| 11 | 1.1 | 21.4 | 71:00 | Soft Gel |
| 12 | 1.1 | 21.4 | 75:00 | Soft Gel |
| 13 | 1 | 19.45 | 74:00 | Soft Gel |

TABLE II

Gelation of Aqueous Sodium Silicate

| Sample No. | NaTCA (gms/100 ml Solution) | Temp. (°F.) | Gel Time (Min.) | Gel Quality |
|---|---|---|---|---|
| 1 | 2.0 | 200 | 40 | Firm Gel |
| 2 | 1.5 | 200 | 46 | Firm Gel |
| 3 | 2.0 | 180 | 127 | Firm Gel |
| 4 | 2.0 | 180 | 125 | Firm Gel |
| 5 | 1.5 | 180 | 187 | Fair Gel |
| 6 | 1.5 | 180 | 188 | Fair Gel |
| 7 | 2.0 | 165 | 350 | Firm Gel |
| 8 | 2.0 | 165 | 350 | Firm Gel |
| 9 | 1.5 | 165 | 523 | Fair Gel |
| 10 | 1.5 | 165 | 515 | Fair Gel |
| 11 | 2.0 | 150 | 708 | Fair Gel |
| 12 | 2.0 | 150 | 710 | Fair Gel |
| 13 | 1.5 | 150 | 1408 | Fair Gel |
| 14 | 1.5 | 150 | 1411 | Fair Gel |
| 15 | 2.0 | 140 | 2181 | Weak Gel |
| 16 | 2.0 | 140 | 2172 | Weak Gel |
| 17 | 1.5 | 140 | 3877 | Weak Gel |
| 18 | 1.5 | 140 | 3816 | Weak Gel |

TABLE III

Gelation of Aqueous Sodium Silicate With 2 Grams NaTCA

| Temperature (°F.) | Cloud Time (min.) | Gel Time (min.) | Gel Quality |
|---|---|---|---|
| 140 | 1790 | 2160 | Weak Gel |
| 150 | — | 1470 | Firm Gel |
| 165 | 435 | 460 | Firm Gel |
| 180 | 110 | 125 | Firm Gel |
| 200 | — | 53 | Firm Gel |

TABLE IV

Gelation of Aqueous Sodium Silicate With 1.5 Grams NaTCA

| Temperature (°F.) | Cloud Time (min.) | Gel Time (min.) | Gel Quality |
|---|---|---|---|
| 140 | 3000 | 3840 | Fair Gel (settling) |
| 150 | 1095 | 1250 | Firm Gel |
| 165 | 145 | 180 | Firm Gel |
| 180 | — | — | Firm Gel |
| 200 | — | 33 | Firm Gel |

TABLE V

Gelation of Aqueous Sodium Silicate

| NaTCA Grams/100 ml Total Solution | Gel Time, Minutes | | |
|---|---|---|---|
| | 165° F. | 180° F. | 200° F. |
| 1.5 | 650 | 178 | 51 |
| 1.5 | 540 | 175 | 54 |
| 1.5 | 519 | 187 | 46 |
| 2.0 | 416 | 136 | 44 |
| 2.0 | 355 | 140 | 42 |
| 2.0 | 350 | 126 | 40 |

EXAMPLE 2

50 milliliter samples of the sodium silicate solution without filler described in Example 1 are placed in containers in constant temperature baths. Various acid producing activators are mixed with the sodium silicate solution samples in quantities such that the acid concentration upon disassociation of the activators are 19.45 milliequivalents per 16 milliliters of concentrated aqueous silicate in some of the samples and 10.4 milliequivalents per 16 milliliters of concentrated aqueous silicate in the other of the samples. The samples are maintained at temperatures of 200° F. and 70° F. while being stirred and the times for initial gel formation noted. The results of these tests are shown in Table VI below.

TABLE VI

Gelation Of Aqueous Sodium Silicate Using Various Concentrations Of Various Activators

| Sample No. | Activator Used | Quantity of Activator (Gms/100 ml Solution) | MEQ—H+ | Temp. of Sample 200° F. | | 70° F. | |
|---|---|---|---|---|---|---|---|
| | | | | Gel Time (min.) | Observations | Gel Time (days) | Observations |
| 1 | Sodium Trichloroacetate (NaTCA) | 1.0 | 19.45 | 74 | Soft Gel | | No Gel* |
| 2 | Trichloroacetic Acid | 0.636 | 19.45 | 74 | Soft Gel | | No Gel* |
| 3 | Ethyl Trichloroacetate | 0.745 | 19.45 | 74 | Soft Gel | | No Gel* |
| 4 | Ethylacetate | 1.712 | 19.45 | 16 | Soft Gel | 7 | Weak Gel |
| 5 | Hydrochloric Acid (1.04 N Solution) | 18.70 ml | 19.45 | 15 | Soft Gel | 7 | Weak Gel |
| 6 | Sodium Trichloroacetate (NaTCA) | 0.534 | 10.4 | No Gel** | | | No Gel* |
| 7 | Trichloroacetic Acid | 0.340 | 10.4 | No Gel** | | | No Gel* |
| 8 | Ethyl Trichloroacetate | 0.398 | 10.4 | No Gel** | | | No Gel* |

TABLE VI-continued

| | | Gelation Of Aqueous Sodium Silicate Using Various Concentrations Of Various Activators | | | | | |
|---|---|---|---|---|---|---|---|
| | | Quantity of Activator | | Temp. of Sample | | | |
| | | (Gms/100 ml | | 200° F. | | 70° F. | |
| Sample No. | Activator Used | Solution) | MEQ—H+ | Gel Time (min.) | Observations | Gel Time (days) | Observations |
| 9 | Ethylacetate | 0.915 | 10.4 | | No Gel** | | No Gel* |
| 10 | Hydrochloric Acid (1.04 N Solution) | 10 ml | 10.4 | | No Gel** | | No Gel* |

*No gel up to 7 days
**Slight precipitation in 7 days

From Table VI it can be seen that activator concentrations below an acid concentration in milliequivalents of about 20 per 16 milliliters of concentrated aqueous silicate do not bring about gelation.

What is claimed is:

1. An aqueous silicate mixture which does not gel for a period of time below a given temperature but which rapidly gels at temperatures above said given temperature comprising water, a water soluble silicate and an activator which reacts above said given temperature to gel said mixture, said aqueous silicate mixture having a pH in the range of about 9 to 13 at a temperature below said given temperature and said activator being at least one compound of the following formula:

$$X_n R\text{-}W$$

wherein:
n is an integer in the range of from 1 to 6;
X is a halide substituent on an alpha chain, a terminal carbon or both;
R is an alkyl radical, an aryl radical or an alkyl aryl radical with the alkyl radicals having in the range of from 1 to 6 carbon atoms and the aryl radicals having in the range of from 6 to 10 carbon atoms and
W-is an aldehyde group.

2. An aqueous silicate mixture which does not gel for a period of time below a given temperature but which rapidly gels at temperatures above said given temperature comprising water, a water soluble metal silicate and an activator which reacts above said given temperature to gel said mixture, said aqueous silicate mixture having a pH in the range of about 9 to 13 at a temperature below said given temperature and said activator being at least one compound of the following formula:

$$X_n R\text{-}W$$

wherein:
n is an integer in the range of from 1 to 6;
X is a halide substituent on an alpha chain, a terminal carbon or both;
R is an alkyl radical, an aryl radical or an aklylaryl radical with the alkyl radicals having in the range of from 1 to 6 carbon atoms and the aryl radicals having in the range of from 6 to 10 carbon atoms; and
W is a sulfonyl group.

3. An aqueous silicate mixture which does not gel for a period of time below a given temperature but which rapidly gels at temperatures above said given temperature comprising water, a water soluble metal silicate and an activator which reacts at said given temperature to gel said mixture, said aqueous silicate mixture having a pH in the range of about 9 to 13 at a temperature below said given temperature and said activator being at least one compound of the following formula:

$$X_n R\text{---}\underset{\underset{M^+}{|}}{\overset{\overset{O}{\|}}{C}}\text{---}O$$

wherein:
R is a hydrocarbon radical having in the range of from 1 to 3 carbon atoms;
X is a halogen radical substituent of fluorine, chlorine or combinations thereof;
n is an integer in the range of from 1 to 3; and M is a cation of alkali metal, alkaline earth metal or ammonium ion.

4. The aqueous silicate mixture of claim 3 wherein:
R is an alkyl radical having in the range of from 1 to 3 carbon atoms;
X is a halogen radical substituent of fluorine, chlorine and combinations thereof;
n is an integer in the range of from 1 to 3; and
M is an alkali metal cation.

5. The aqueous silicate mixture of claim 3 wherein:
R is a linear alkyl radical having in the range of from 1 to 3 carbon atoms in the linear chain;
n is an integer in the range of from 1 to 3;
X is a halogen radical substituent of fluorine, chlorine or combinations thereof; and
M is a cation of sodium, potassium or mixtures thereof.

6. A pumpable aqueous silicate mixture which can be gelled to a solid comprising water, a water soluble silicate of sodium, potassium and combinations thereof, and an activator which produces acid or acid equivalents at or above a certain temperature level comprising at least one compound of the formula:

$$X_3 R\text{---}\underset{\underset{M^+}{|}}{\overset{\overset{O}{\|}}{C}}\text{---}O$$

wherein:
R is an alkyl radical having in the range of from 1 to 3 atoms;
X is a halogen radical substituent on the terminal carbon atom of R of fluorine, chlorine or combinations thereof; and
M is a cation of sodium, potassium or combinations thereof; and
wherein said activator is present in said mixture in an amount such that at or above said certain temperature level said activator lowers the pH of said mixture and gels said mixture.

7. The aqueous silicate mixture of claim 6 wherein:
R is an alkyl radical having one carbon atom;
X is a halogen radical substituent and is fluorine, chlorine or a combination thereof; and
M is a cation of sodium, potassium or combinations thereof.

8. A pumpable aqueous silicate mixture which can be gelled to a solid comprising water, a water soluble silicate of sodium, potassium and combinations thereof, and an activator which produces acid or acid equivalents at and above a certain temperature level comprising at least one compound of the formula:

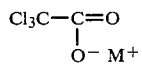

wherein:

M is a cation of sodium, potassium or combinations thereof; and wherein said activator is present in said mixture in an amount such that at or above said certain temperature level said activator lowers the pH of said mixture and gels said mixture.

9. A pumpable aqueous silicate mixture which can be gelled to a solid comprising water, a water soluble silicate of sodium, potassium, and combinations thereof, and an activator which produces acid or acid equivalents at and above a certain temperature level comprising at least one compound of the formula:

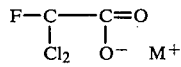

wherein:

M is a cation of sodium, potassium or combinations thereof; and wherein said activator is present in said mixture in an amount such that at or above said certain temperature level said activator lowers the pH of said mixture and gels said mixture.

10. A pumpable aqueous silicate mixture which can be gelled to a solid comprising water, a water soluble silicate of sodium, potassium and combinations thereof, and an activator which produces acid or acid equivalents at and above a certain temperature level comprising at least one compound of the formula:

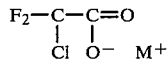

wherein:

M is a cation of sodium, potassium or combinations thereof; and wherein said activator is present in said mixture in an amount such that at or above said certain temperature level said activator lowers the pH of said mixture and gels said mixture.

11. A pumpable aqueous silicate mixture which can be gelled to a solid comprising water, a water soluble silicate of sodium, potassium and combinations thereof, and an activator which produces acid or acid equivalents at and above a certain temperature level comprising at least one compound of the formula:

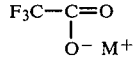

wherein:

M is a cation of sodium, potassium or combinations thereof; and wherein said activator is present in said mixture in an amount such that at or above said certain temperature level said activator lowers the pH of said mixture and gels said mixture.

12. An aqueous silicate mixture which does not gel for a period of time below a given temperature but which rapidly gels at temperatures above said given temperature comprising water, a water soluble metal silicate and an activator which reacts above said given temperature to gel said mixture, said aqueous silicate mixture having a pH in the range of about 9 to 13 at a temperature below said given temperature and said activator being at least one compound of the following formula:

wherein:

n is an integer in the range of from 1 to 6;

X is a halide substituent on an alpha chain, a terminal carbon or both;

R is an alkyl radical, an aryl radical or an alkylaryl radical with the alkyl radicals having in the range of from 1 to 6 carbon atoms and the aryl radicals having in the range of from 6 to 10 carbon atoms; and W is an aldehyde group, a sulfonyl group, the acid equivalent of such radicals or combinations thereof.

13. A process of selectively forming an impermeable gel comprising the steps of: mixing water, a water soluble metal silicate and an activator to form a mixture which does not gel for a period of time below a given temperature but which rapidly gels at temperatures above said given temperature, said aqueous silicate mixture having a pH in the range of from about 9 to 13 at a temperature below said given temperature and said activator being at least one compound of the following formula present in said mixture at a concentration to produce a total acid or acid equivalent concentration in said mixture of less than about 20 milliequivalents per 16 milliliters of concentrated aqueous silicate mixed with water below said given temperature and above about 20 milliequivalents per 16 milliliters of concentrated aqueous silicate per 100 ml total aqueous mixture above said given temperature:

wherein:

n is an integer in the range of from 1 to 6;

X is a halide substituent on an alpha chain, a terminal carbon or both;

R is an alkyl radical, an aryl radical or an alkyl aryl radical with the alkyl radicals having in the range of from 1 to 6 carbon atoms and the aryl radicals having in the range of from 6 to 10 carbon atoms; and W is an aldehyde group; and gelling said mixture by increasing the temperature of said mixture to said given temperature.

14. A process of selectively forming an impermeable gel comprising the steps of: mixing water, a water soluble metal silicate and an activator to form a mixture which does not gel for a period of time below a given temperature but which rapidly gels at temperatures above said given temperature, said aqueous silicate mixture having a pH in the range of from about 9 to 13 at a temperature below said given temperature and said activator being at least one compound of the following formula present in said mixture at a concentration to produce a total acid or acid equivalent concentration in said mixture of less than about 20 milliequivalents per 16 milliliters of concentrated aqueous silicate mixture with water below said given temperature and above about 20 milliequivalents per 16 milliliters of concentrated aqueous silicate per 100 ml total aqueous mixture above said given temperature:

$$X_nR-W$$

wherein:
n is an integer in the range of from 1 to 6;
X is a halide substituent on an alpha chain, a a terminal carbon or both;
R is an alkyl radical, an aryl radical or an alkylaryl radical with the alkyl radicals having in the range of from 1 to 6 carbon atoms and the aryl atoms having in the range of from 6 to 10 carbon atoms; and
W is a sulfonyl group and
gelling said mixture by increasing the temperature of said mixture to said given temperature.

15. A process of forming an impermeable gel comprising the steps of: mixing water, a water soluble metal silicate and an activator to form a mixture which does not gel for a period of time below a given temperature but which rapidly gels at temperatures above said given temperature, said aqueous silicate mixture having a pH in the range of about 9 to 13 at a temperature below said given temperature and said activator being at least one compound of the following formula present in said mixture at a concentration to produce a total acid or acid equivalent concentration of less than about 20 milliequivalents per 16 milliliters of concentrated aqueous silicate mixed with water below said given temperature and above about 20 milliequivalents per 16 milliliters of concentrated aqueous silicate per 100 ml total aqueous mixture above said given temperature:

$$X_nR-\underset{\underset{O^-\ M^+}{|}}{C}=O$$

wherein:
R is a hydrocarbon radical having in the range of from 1 to 3 carbon atoms;
X is a halogen radical substituent of fluorine, chlorine or combinations thereof;
n is an integer in the range of from 1 to 3; and
M is a cation of alkali metal, alkaline earth metal or ammonium ion; and
gelling said mixture by increasing the temperature of said mixture to said given temperature.

16. The process of claim 15 wherein:
R is an alkyl radical having in the range of from 1 to 3 carbon atoms;
X is a halogen radical substituent of fluorine, chlorine and combinations thereof;
n is an integer in the range of from 1 to 3; and
M is an alkali metal cation.

17. The process of claim 15 wherein:
R is a linear alkyl radical having in the range of from 1 to 3 carbon atoms in the linear chain;
n is an integer in the range of from 1 to 3;
X is a halogen radical substituent of fluorine, chlorine or combinations thereof; and
M is a cation of sodium, potassium or mixtures thereof.

18. A process of forming an impermeable gel comprising the steps of:
mixing water, a water soluble metal silicate and an activator to form a mixture which does not gel for a period of time below a given temperature but which rapidly gels at temperatures above said given temperature, said aqueous silicate mixture having a pH in the range of about 9 to 13 at a temperature below said given temperature and said activator being at least one compound of the following formula present in said mixture at a concentration to produce a total acid or acid equivalent concentration of less than about 20 milliequivalents per 16 milliliters of concentrated aqueous silicate mixed with water below said given temperature and above about 20 milliequivalents per 16 milliliters of concentrated aqueous silicate per 100 ml total aqueous mixture above said given temperature;

$$X_3R-\underset{\underset{O^-\ M^+}{|}}{C}=O$$

wherein:
R is an alkyl radical having in the range of from 1 to 3 atoms;
X is a halogen radical substituent on the terminal carbon atom of R of fluorine, chlorine or combinations thereof; and
M is a cation of sodium, potassium or combinations thereof; and
gelling said mixture by increasing the temperature of said mixture to said given temperature.

19. The process of claim 18 wherein:
R is an alkyl radical having one carbon atom;
X is a halogen radical substituent and is fluorine, chlorine or a combination thereof; and
M is a cation of sodium, potassium or combinations thereof.

20. A process of forming an impermeable gel comprising the steps of:
mixing water, a water soluble metal silicate and an activator to form a mixture which does not gel for a period of time below a given temperature but which rapidly gels at temperatures above said given temperature, said aqueous silicate mixture having a pH in the range of about 9 to 13 at a temperature below said given temperature and said activator being at least one compound of the following formula present in said mixture at a concentration to produce a total acid or acid equivalent concentration of less than about 20 milliequivalents per 16 milliliters of concentrated aqueous silicate below said given temperature and above about 20 milliequivalents per 16 milliliters of concentrated aqueous silicate above said given temperature:

$$Cl_3-C-\underset{\underset{O^-\ M^+}{|}}{C}=O$$

wherein:
M is a cation of sodium, potassium or combinations thereof; and
gelling said mixture by increasing the temperature of said mixture to said given temperature.

21. A process of forming an impermeable gel comprising the steps of:
mixing water, a water soluble metal silicate and an activator to form a mixture which does not gel for a period of time below a given temperature but which rapidly gels at temperatures above said given temperature, said aqueous silicate mixture having a pH in the range of about 9 to 13 at a temperature below said given temperature and said activator being at least one compound of the following formula present in said mixture at a concentration to produce a total acid or acid equivalent concentration of less than about 20 milliequivalents per 16 milliliters of concentrated aqueous silicate below said given temperature and above about 20 milliequivalents per 16 milliliters of concentrated aqueous silicate above said given temperature:

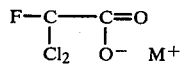

wherein:

M is a cation of sodium, potassium or combinations thereof; and gelling said mixture by increasing the temperature of said mixture to said given temperature.

22. A process of forming an impermeable gel comprising the steps of:

mixing water, a water soluble metal silicate and an activator to form a mixture which does not gel for a period of time below a given temperature but which rapidly gels at temperatures above said given temperature, said aqueous silicate mixture having a pH in the range of about 9 to 13 at a temperature below said given temperature and said activator being at least one compound of the following formula present in said mixture at a concentration to produce a total acid or acid equivalent concentration of less than about 20 milliequivalents per 16 milliliters of concentrated aqueous silicate below said given temperature and above about 20 milliequivalents per 16 milliliters of concentrated aqueous silicate above said given temperature:

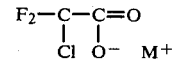

wherein:

M is a cation of sodium, potassium or combinations thereof; and gelling said mixture by increasing the temperature of said mixture to said given temperature.

23. A process of forming an impermeable gel comprising the steps of:

mixing water, a water soluble metal silicate and an activator to form a mixture which does not gel for a period of time below a given temperature but which rapidly gels at temperatures above said given temperature, said aqueous silicate mixture having a pH in the range of about 9 to 13 at a temperature below said given temperature and said activator being at least one compound of the following formula present in said mixture at a concentration to produce a total acid or acid equivalent concentration of less than about 20 milliequivalents per 16 milliliters of concentrated aqueous silicate below said given temperature and above about 20 milliequivalents per 16 milliliters of concentrated aqueous silicate above said given temperature:

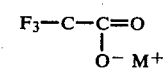

wherein:

M is a cation of sodium, potassium or combinations thereof; and gelling said mixture by increasing the temperature of said mixture to said given temperature.

* * * * *